(12) United States Patent
Kwon et al.

(10) Patent No.: US 7,065,377 B2
(45) Date of Patent: Jun. 20, 2006

(54) METHOD AND APPARATUS FOR CONTROLLING TRANSMISSION POWER OF CONTROL INFORMATION IN A MOBILE COMMUNICATION SYSTEM

(75) Inventors: Hwan-Joon Kwon, Seoul (KR); Ho-Kyu Choi, Songnam-shi (KR); Dong-Hee Kim, Seoul (KR); Youn-Sun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 614 days.

(21) Appl. No.: 10/303,272

(22) Filed: Nov. 25, 2002

(65) Prior Publication Data

US 2003/0100329 A1    May 29, 2003

(30) Foreign Application Priority Data

Nov. 23, 2001    (KR) ...................... 10-2001-0073483

(51) Int. Cl.
*H04B 7/00* (2006.01)
*H04Q 7/20* (2006.01)

(52) U.S. Cl. .................. 455/522; 455/69; 455/502; 455/503; 455/509; 455/561; 455/511; 455/450; 370/335; 370/342; 370/341; 375/137; 375/149

(58) Field of Classification Search ................ 455/561, 455/522, 511, 524, 62, 502, 509, 450, 69; 370/335, 342, 347, 330, 332, 341; 375/142, 375/130

See application file for complete search history.

(56) References Cited

U.S. PATENT DOCUMENTS 5,539,728 A * 7/1996 Gaiani et al. ................ 370/342
5,835,527 A * 11/1998 Lomp .......................... 375/142

(Continued)

FOREIGN PATENT DOCUMENTS

EP    1 065 800 A1    1/2001

(Continued)

OTHER PUBLICATIONS

International Search Report dated Feb. 25, 2003 issued in a counterpart application, namely, Appln. No. PCT/KR02/02191.

(Continued)

*Primary Examiner*—Marceau Milord
(74) *Attorney, Agent, or Firm*—Dilworth & Barrese LLP

(57) ABSTRACT

A base station apparatus for controlling power of individual control information transmitted to mobile stations. A first mobile station receives its own control information, and a second mobile station receives its own control information and control information for the first mobile station. A receiver receives information on forward channel conditions of the mobile stations for a previous time period. A channel transmitter transmits individual control information to the first mobile station and the second mobile station for a preset time period. A required transmission power calculator calculates power levels required for transmitting control information to each of the mobile stations for the preset time period taking into consideration the forward channel condition of each of the mobile stations and transmission power used for transmitting control information to each of the mobile stations for the previous time period. A transmission power controller transmits control information for the first mobile station at a higher power level out of the calculated required power levels and transmits control information for the second mobile station at a corresponding power level out of the calculated required power levels.

18 Claims, 5 Drawing Sheets

U.S. PATENT DOCUMENTS

| | | | | |
|---|---|---|---|---|
| 5,854,981 | A | * | 12/1998 | Wallstedt et al. ............ 455/439 |
| 5,915,221 | A | * | 6/1999 | Sawyer et al. ............... 455/437 |
| 5,950,130 | A | * | 9/1999 | Coursey .................. 455/432.1 |
| 5,963,583 | A | * | 10/1999 | Davidovici et al. ......... 375/130 |
| 5,974,036 | A | * | 10/1999 | Acharya et al. ............. 370/331 |
| 5,983,112 | A | * | 11/1999 | Kay ............................ 455/504 |
| 5,991,636 | A | * | 11/1999 | Won et al. ................... 455/522 |
| 6,175,744 | B1 | * | 1/2001 | Esmailzadeh et al. ....... 455/522 |
| 6,226,316 | B1 | * | 5/2001 | Schilling et al. ............ 375/142 |
| 6,418,322 | B1 | | 7/2002 | Kim et al. |
| 6,483,816 | B1 | * | 11/2002 | Tsunehara et al. .......... 370/318 |
| 6,904,290 | B1 | * | 6/2005 | Palenius ..................... 455/522 |

FOREIGN PATENT DOCUMENTS

| | | |
|---|---|---|
| JP | 09-074378 | 3/1997 |
| JP | 2000-013310 | 1/2000 |
| JP | 2001-168784 | 6/2001 |
| KR | 2001-71528 | 11/2001 |
| WO | WO 00/33480 | 6/2000 |
| WO | WO 00/54430 | 9/2000 |

OTHER PUBLICATIONS

European Search Report dated Mar. 21, 2003, issued in a counterpart application, namely, Appln. No. 02026107.9.

* cited by examiner

METHOD AND APPARATUS FOR CONTROLLING TRANSMISSION POWER OF CONTROL INFORMATION IN A MOBILE COMMUNICATION SYSTEM

PRIORITY

This application claims priority to an application entitled "Method and Apparatus for Controlling Transmission Power of Control Information in a Mobile Communication System" filed in the Korean Industrial Property Office on Nov. 23, 2001 and assigned Ser. No. 2001-73483, the contents of which are incorporated herein by reference.

BACKGROUND OF THE INVENTION

1. Field of the Invention

The present invention relates generally to a mobile communication system supporting a multimedia service including voice and data services, and in particular, to a method and apparatus for controlling transmission power of control information used for processing data provided from a base station to a mobile station.

2. Description of the Related Art

An IS-2000 CDMA (Code Division Multiple Access) mobile communication system, a typical mobile communication system, supports only a voice service. However, with the development of communication technology and at the request of users, research has been carried out on a mobile communication system supporting a data service. For example, an HDR (High Data Rate) communication system has been proposed to support only a high-speed data service. The existing mobile communication systems are classified into a mobile communication system for supporting only the voice service and another mobile communication system for supporting only the data service. That is, although the mobile communication system is required to support both the voice service and the data service, the conventional mobile communication system is designed to support only one of the voice service and the data service. Consequently, there has been a long demand for a mobile communication system capable of supporting both the voice service and the data service. To meet the demand, a 1xEV-DV (Evolution in Data and Voice) mobile communication system has recently been proposed.

A mobile communication system supporting a multimedia service including a voice service and a data service includes a base station (BS) and a plurality of mobile stations (MSs) connected to the base station. Such a mobile communication system provides mobile stations (or users) with a voice service using the same frequency band, and provides the mobile stations with a data service by code division multiplexing (CDM). CDM is a technique for simultaneously providing a data service to a plurality of users at the same time period (e.g., slot). The mobile communication system includes a packet data channel (PDCH) for packet data transmission, and a packet data control channel (PDCCH), e.g., a secondary packet data control channel, for efficient transmission of packet data. The packet data channel is used to transmit packet data. Transmission of packet data over the air is performed in a physical layer packet (PLP) unit, and a length of the physical layer packet is varied at each transmission. The packet data control channel is used to transmit control information for enabling mobile stations or receivers to efficiently receive packet data. Typically, the control information includes a MAC ID (Medium Access Control Identifier) for user identification, and a last Walsh code index indicating a Walsh code to be used during a service among a plurality of Walsh codes provided by a base station.

Control information transmitted from a base station to mobile station over the packet data control channel undergoes power control. Conventionally, power control on the packet data control channel was independently performed, taking into consideration a channel environment of each mobile station. For example, among a plurality of mobile stations, a first mobile station receives first control information provided from the base station over a primary packet data control channel assigned thereto, and a second mobile station receives second control information provided from the base station over a secondary packet data control channel assigned thereto. If a channel environment of the first mobile station is poor, the base station performs a power control operation to increase power of the first control information. Likewise, if a channel environment of the second mobile station is poor, the base station performs a power control operation to increase power of the second control information. Such a power control operation is performed on the assumption that unique control information is provided to each mobile station.

Recently, in some cases, each mobile station of the mobile communication system consults not only the control information provided thereto but also control information provided to other mobile stations. This is to reduce the number of bits of control information transmitted from the base station, and efficiently use the control information. For example, if it is assumed that the number of Walsh codes provided from a base station is 32 and the number of Walsh codes to be used by a particular one of the mobile stations is 10, then the base station conventionally transmits all of the information indicating each of the 10 Walsh codes to the particular one of the mobile stations. However, recently, there has been proposed a method of transmitting only Walsh code space indicator information indicating some of the 10 Walsh codes. In this case, each mobile station consults not only its own Walsh code space indicator information but also Walsh code space indicator information for other mobile stations.

As stated above, when each mobile station of the mobile communication system processes received data by consulting not only the control information provided thereto, but also control information provided to other mobile stations, a new power control operation, different from the conventional power control operation, is required.

SUMMARY OF THE INVENTION

It is, therefore, an object of the present invention to provide a method and apparatus for controlling by a base station, transmission power of control information to be provided to mobile stations when each mobile station in a mobile communication system processes received data by consulting not only control information provided thereto, but also control information provided to other mobile stations.

To achieve the above and other objects, there is provided a base station apparatus for controlling power of individual control information transmitted to mobile stations by a base station in a communication system including the base station and at least the two mobile stations connected to the base station. The mobile stations simultaneously receive a data service from the base station for a preset time period, wherein the base station transmits to the mobile stations control information to be uniquely used for the mobile stations during the data service. A first mobile station out of the mobile stations receives its own control information transmitted from the base station, and a second mobile station out of the mobile stations receives its own control information and control information for the first mobile station transmitted from the base station. A channel environment information receiver receives information on forward channel conditions of the mobile stations for a previous time period preceding the preset time period. A channel transmitter transmits individual control information to the first mobile station and the second mobile station for the preset time period. A required transmission power calculator calculates power levels required for transmitting control information to each of the mobile stations for the preset time period, taking into consideration the forward channel condition of each of the mobile stations and transmission power used for transmitting control information to each of the mobile stations for the previous time period. A transmission power controller transmits control information for the first mobile station at a higher power level out of the calculated required power levels and transmits control information for the second mobile station at a corresponding power level out of the calculated required power levels.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

First, a description will be first made of a packet data control channel transceiver to which the present invention will be applied. Next, a description will be given of a transmitter for controlling transmission power of control information provided from a base station to mobile stations over a packet data control channel according to an embodiment of the present invention. Thereafter, a description will be made of a procedure for controlling transmission power of a packet data control channel according to different embodiments of the present invention.

Before a detailed description of the present invention, a definition of the terminologies used herein will be given herein below. The term "control information" typically represents Walsh code space indictor information. However, it should be noted that the control information is not necessarily confined to the Walsh code space indicator information, and instead, the control information indicates all control information used by each mobile station to provide a data service by consulting not only its own control information, but also control information for other mobile stations. The term "Walsh code space indicator information" is information indicating Walsh codes to be used by a mobile station for a data service, and this information is transmitted from a base station to a mobile station. The term "channel environment information" is information indicating a forward channel condition between a base station and a mobile station. For example, the channel environment information represents a measured level of a forward pilot channel signal. The term "required transmission power" indicates power required for transmitting control information, determined using a channel condition and transmission power in a first time period, in a second time period following the first time period. The term "packet data control channel (PDCCH)" indicates a channel for transmitting control information that can be used by a mobile station to process data transmitted from a base station. At times, the packet data control channel will have the same meaning as the control information. The term "mobile station" indicates a user receiving a data service from a base station. Occasionally, the user will have the same meaning as the mobile station. The term "forward" indicates a signal flow from a base station to a mobile station, and the term "forward channel condition" indicates a condition of a radio link connected from a base station to a mobile station.

Figure 1:
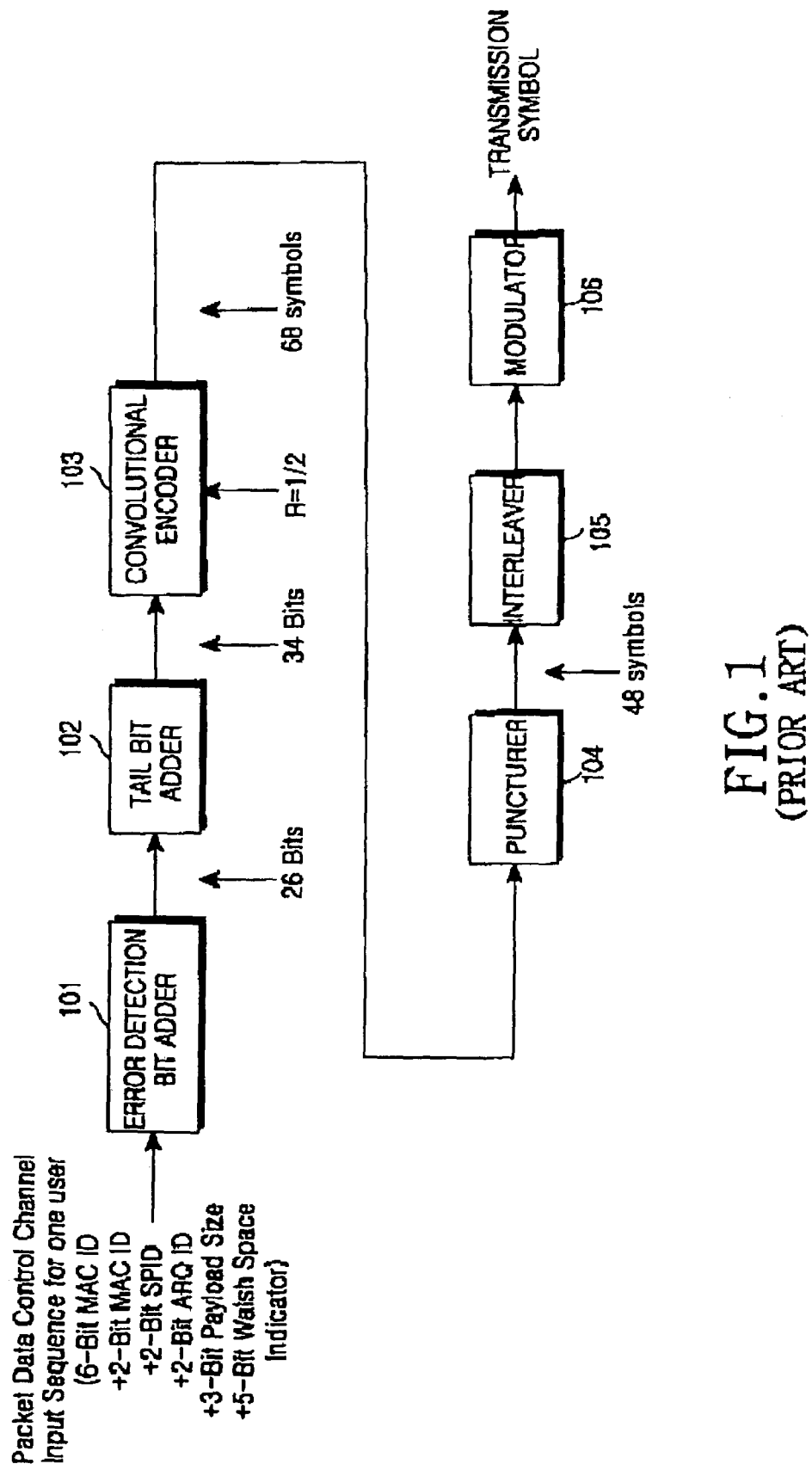
FIG. 1 illustrates a packet data control channel transmitter to which the present invention will be applied.

FIG. 1 illustrates a packet data control channel transmitter to which the present invention will be applied. The transmitter is included in a base station of a mobile communication system supporting a multimedia service including voice and data services. The packet data control channel (PDCCH) is used to indicate a transmission method of a packet data channel transmitted to each user, and is transmitted to a particular user. If a packet data channel for transmitting user data is transmitted to a plurality of users by code division multiplexing (CDM), as many packet data control channels as the number of the users must be transmitted. Each user receiving the packet data channel receives its own packet data control channel among the plurality of packet data control channels to determine a reception method of a packet data channel to be received, and receives packet data by the determined reception method.

Referring to FIG. 1, it is assumed that a packet data control channel input sequence, control information transmitted over the packet data control channel, is comprised of 18 bits. Although the control information is assumed herein to have 18 bits, it would be obvious to those skilled in the art that the number of bits of the control information is not restricted to 18. The control information includes a 6-bit MAC ID (Medium Access Control Identifier), a 2-bit SPID (Sub-Packet ID), a 2-bit ARQ (Automatic Repeat Request) channel ID, a 3-bit payload size, and 5-bit Walsh code information. The MAC ID, an identifier for user identification, is assigned to each user desiring to receive a high-speed packet data service during system access. In a mobile communication system supporting high-speed packet transmission, such as a 1xEV-DV system, a transmission unit of data transmitted over a packet data channel is called a "sub-packet." The SPID, an identifier for each sub-packet among a plurality of sub-packets, becomes a retransmission unit during retransmission of packet data. The ARQ channel ID, an identifier for data continuously transmitted to a particular user, is used to identify a parallel transmission channel. The payload size is the number of information bits constituting one sub-packet. The Walsh code information is used to indicate Walsh code information used for a packet data channel. Every mobile station desiring to receive a high-speed packet data service is assigned its unique MAC ID from a base station during system access. The mobile station, each time it receives a packet data control channel, demodulates the received packet data control channel, and analyzes MAC ID included in the demodulated packet data control channel to determine whether the received packet is its own packet data. If the received packet data is its own packet data, the corresponding mobile station demodulates a packet data channel based on information of the payload size, SPID, ARQ channel ID, and Walsh code used for the packet data channel.

Control information transmitted over the packet data control channel is encoded by an error detection bit adder 101. The error bit detection adder 101 encodes the control information so that a receiver can detect a possible transmission error of the control information, and generates error detection bit-added control information. For example, the error detection bit adder 101 receives 18-bit control information, and encodes the received control information using an 8-bit CRC (Cyclic Redundancy Code). That is, the error detection bit adder 101 generates 26-bit control information by adding 8 error detection bits to the 18-bit control information. An increase in the number of redundancy bits generated by the CRC contributes to an increase in capability for detecting transmission errors. However, it will be assumed herein that only the 8-bit CRC is used.

A tail bit adder 102 adds tail bits to the control information output from the error detection bit adder 101, and provides its output to a convolutional encoder 103. The convolutional encoder 103 convolutionally-encodes an output of the tail bit adder 102, and provides coded symbols to a puncturer 104. The tail bit adder 102 adds 8 tail bits of all 0's for convolutional encoding by the convolutional encoder 103. The tail bit-added control information is convolutionally-encoded by the convolutional encoder 103 at a preset coding rate (e.g., 1/2). The convolutionally-encoded symbols are provided to the puncturer 104. For example, the convolutional encoder 103 receives 34 bits obtained by adding the 8 tail bits to the 26 bits output from the error detection bit adder 101 by the tail bit adder 102, and outputs 68 symbols by encoding the received 34 bits at a coding rate 1/2.

The puncturer 104 punctures a predetermined number (e.g., 20) of symbols among the output symbols of the convolutional encoder 103 in order to match its data rate to a proper data rate while minimizing performance degradation, and provides its output to an interleaver 105. The interleaver 105 interleaves output symbols of the puncturer 104. The reason for using the interleaver 105 is as follows. Because the convolutional encoding is susceptible to a burst error, the interleaver 105 is used to reduce a burst error probability by mixing the order of symbols in order to solve the burst error problem. A modulator 106 modulates the symbols interleaved by the interleaver 105 by a modulation technique of QPSK (Quadrature Phase Shift Keying), and transmits the modulated symbols.

Figure 2:
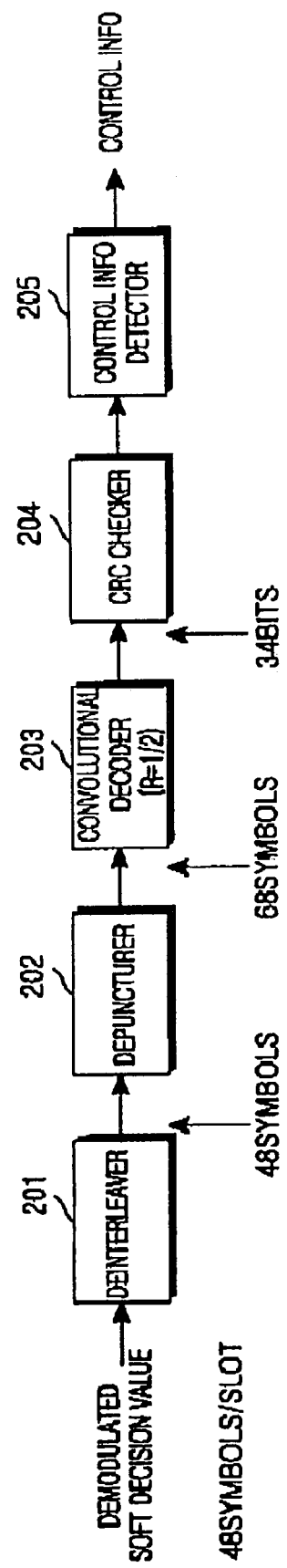
FIG. 2 illustrates a packet data control channel receiver to which the present invention will be applied.

FIG. 2 illustrates a structure of a packet data control channel receiver to which the present invention will be applied. The receiver is included in each mobile station in a mobile communication system. The receiver corresponds to the packet data control channel transmitter of FIG. 1.

Referring to FIG. 2, a deinterleaver 201 performs deinterleaving on a received signal. The received signal provided to the deinterleaver 201 is a soft decision values demodulated by a demodulator (not shown). For example, the demodulated soft decision values are 34 symbols per slot. A depuncturer 202 performs depuncturing on the output of the deinterleaver 201 according to a preset pattern. For example, the depuncturer 202 outputs 68 symbols by depuncturing 20 symbols to 48 symbols provided from the deinterleaver 201. The depunctured symbols are convolutionally-decoded by a convolutional decoder 203. For example, the convolutional decoder 203 decodes the depunctured symbols at a coding rate R=1/2, and outputs 34 bits. A CRC checker 204 performs CRC check on the symbols convolutionally-decoded by the convolutional decoder 203, to determine whether an error exists in the convolutional-decoded symbols. A control information detector 205 determines whether its own control information is received, based on the CRC check results by the CRC checker 204. If the CRC check result represents 'CRC good', the control information detector 205 detects 18-bit packet data control information transmitted from the transmitter, determines that its own packet data control channel has been transmitted. However, if the CRC check result represents 'CRC fail', the control information detector 205 determines that its own packet data control channel is not received.

When the packet data control channels are transmitted to a plurality of users, as many packet data control channels as the number of the users must be individually transmitted to the users.

Next, a description will be made of an operation of transmitting and receiving Walsh code space indicator information (hereinafter, referred to as "Walsh code information" for short) over the packet data control channel. Here, the Walsh code information is information indicating a space of a Walsh code to be used during a data service by a particular one of mobile stations in a mobile communication system by consulting not only its own Walsh code information, but also Walsh code information for other mobile stations.

A base station transmits 5-bit information over the packet data control channel to inform each user of Walsh code information used in a packet data channel. This is applicable when Walsh codes of length 32 are used for the packet data channels. The order of 32 Walsh codes available for a data service is previously agreed between the base station and the mobile stations, and the 5-bit information can indicate a specified one of the Walsh codes. On this assumption, the base station indicates only one point expressed with 5 bits among the Walsh codes through each packet data control channel. Here, a corresponding point indicates a point, or the last point, indicating the last Walsh code among Walsh codes used for a packet data channel of a corresponding mobile station.

A mobile station, having detected Walsh code information from a first packet data control channel, can detect that Walsh codes to be used for its own packet data channel include Walsh codes from the first Walsh code to a Walsh code indicated by the received 5-bit information among the Walsh codes. A mobile station, receiving a second packet data control channel, also detects 5-bit Walsh code information. However, the mobile station receiving the second packet data control channel must receive not only the second packet data control channel but also the first packet data control channel, in order to fully acquire Walsh code information used for its own packet data channel. This is because unlike the first mobile station receiving the first packet data control channel, the second mobile station receiving the second packet data control channel cannot determine a start point of the Walsh codes based on only the 5-bit Walsh code information acquired from the second packet data control channel. Therefore, in order to determine a start point of its own Walsh code, the second mobile station detects an end point of a Walsh code for the first mobile station by receiving the first packet data control channel, and detects that a Walsh code immediately following a Walsh code indicated by the end point is exactly a start point of the Walsh code to be used for a data service.

The above-stated operation of transmitting and receiving information indicating a space of a Walsh code is disclosed in Korean patent application No. 2001-71528, filed by the applicant on Nov. 16, 2001, entitled Method and Apparatus for Transmitting and Receiving Orthogonal Code Index Information in a Mobile Communication System. Although the above-stated operation can be used to control transmission power of a packet data control channel transmitting Walsh code space indicator information, the same operation may be used to control transmission power of a packet data control channel transmitting other information except the Walsh code space indicator information.

Figure 3:
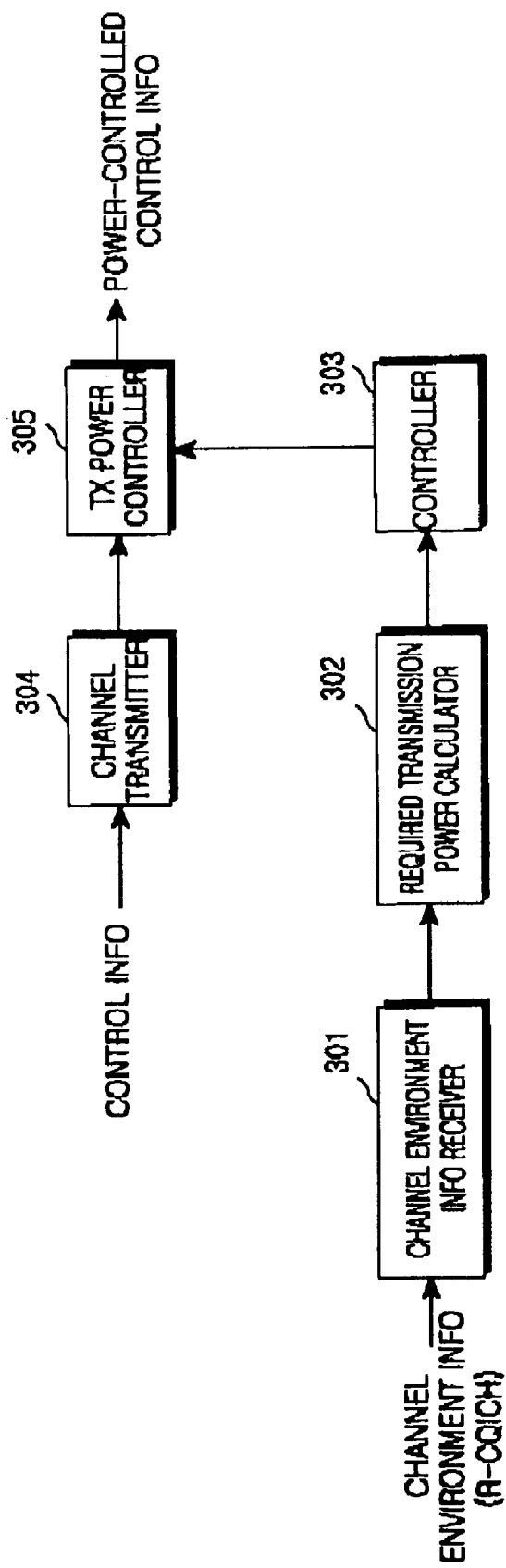
FIG. 3 illustrates a transmitter for controlling transmission power of a packet data control channel according to an embodiment of the present invention.

FIG. 3 illustrates a transmitter for controlling transmission power of a packet data control channel according to an embodiment of the present invention. The transmitter is characterized by controlling transmission power of control information transmitted from a base station to a mobile station over a packet data control channel. The transmitter includes a channel environment information receiver 301, a required transmission power calculator 302, a controller 303, a channel transmitter 304, and a transmission power controller 305.

The channel environment information receiver 301 receives forward channel environment information (or channel condition information) for mobile stations, transmitted from transmitters (not shown) in all mobile stations. For the forward channel environment information, a measured level of a forward pilot channel (F-PICH) signal can be used. The measured level of the forward pilot channel signal can be received from the mobile stations over a reverse channel quality indicator channel (R-CQICH) at periods of a slot (e.g., 1.25 ms). The required transmission power calculator 302 estimates a forward channel environment of a corresponding mobile station from the received forward channel environment information, and based on the estimation results, calculates power required for transmitting control information to the corresponding mobile station. The controller 303 determines transmission power of control information to be provided to a particular mobile station based on the transmission power required for the packet data control channel for the mobile station, calculated by the required transmission power calculator 302. The transmission power controller 305, under the control of the controller 303, controls the transmission power of control information transmitted from the channel transmitter 304 and outputs power-controlled control information for transmission. A power control operation by the transmission power controller 305 is performed at periods of a predetermined time period (e.g., 1.25 ms).

The transmitter controls power of control information to be transmitted to a first mobile station among a plurality of mobile stations for a first time period in a mobile communication system including a base station, and the plurality of mobile stations connected to the base station, for simultaneously receiving a data service for the same time period. Each mobile station has its unique serial number, and processes data provided from the base station by receiving control information for a mobile station having a previous serial number and its own control information from the base station. The channel environment information receiver 301 determines forward channel conditions of a first mobile station and a second mobile station having a serial number following a serial number of the first mobile station for a time period preceding the first time period, based on the measured level of a forward pilot channel. The required transmission power calculator 302 calculates power levels required for transmitting control information to the first mobile station and the second mobile station for the first time period, respectively, taking into consideration the determined forward channel conditions and the transmission power at the previous time period. The controller 303 controls power of control information to be transmitted to the first mobile station at a higher power level among the calculated power levels for the first time period. The operation of calculating required transmission power by the required transmission power calculator 302, the operation of determining transmission power of control information by the controller 303, and the operation of controlling transmission power by the transmission power controller 305 will be described in detail herein below.

Figure 4:
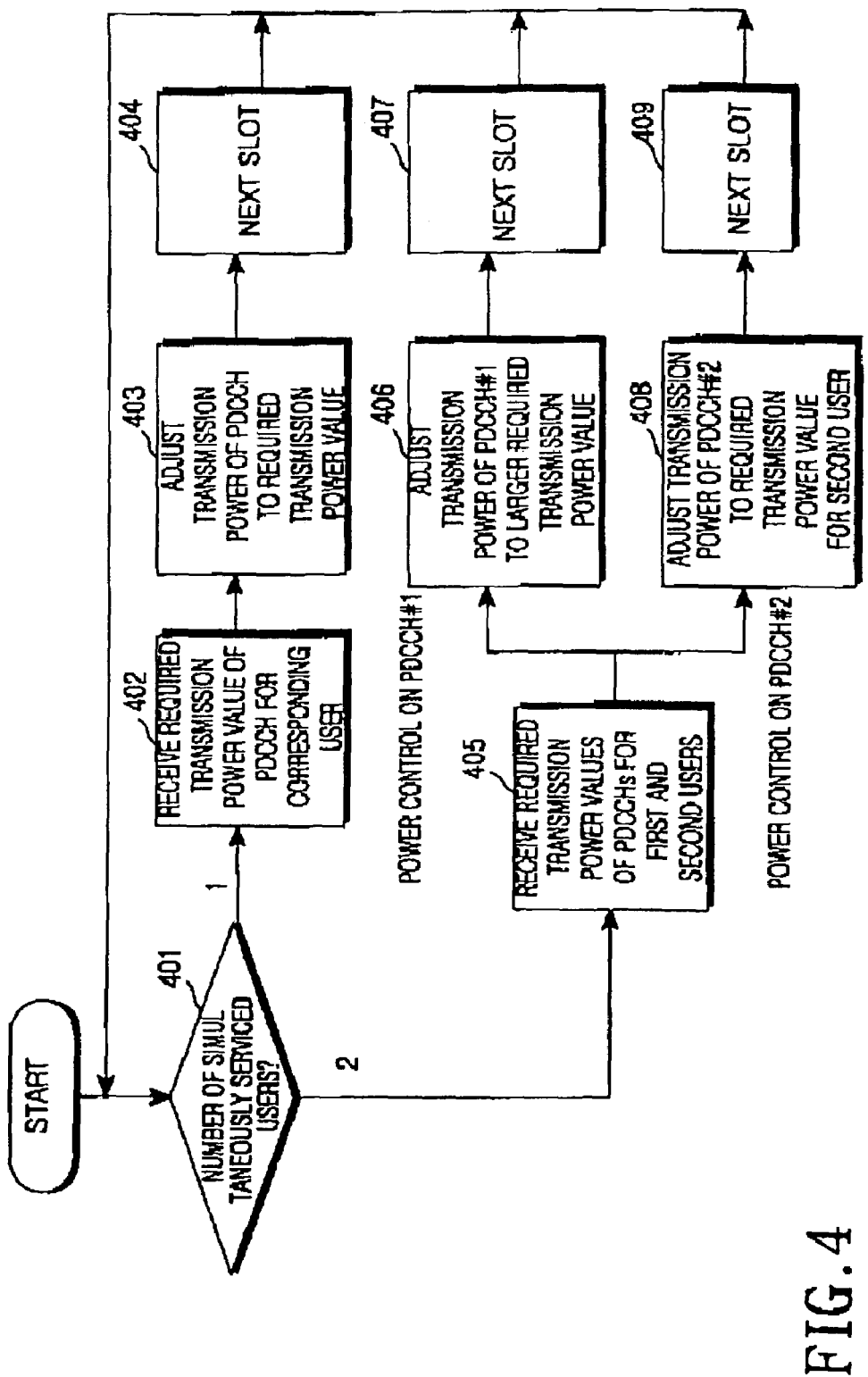
FIG. 4 is a flowchart illustrating a procedure for controlling transmission power of a packet data control channel according to an embodiment of the present invention.

FIG. 4 is a flowchart illustrating a procedure for controlling transmission power of a packet data control channel according to an embodiment of the present invention. Specifically, FIG. 4 illustrates an example of the power control operation performed by the apparatus illustrated in FIG. 3 at periods of a predetermined time period or slot.

Referring to FIG. 4, the controller 303 illustrated in FIG. 3 determines the number of users (or mobile stations) that will be simultaneously serviced for a predetermined time period (or slot) in step 401. The number of the service users can be calculated by a scheduler (not shown). If it is determined that the number of the simultaneously serviced users is 1 in step 401, the controller 303 receives a required transmission power value of a packet data control channel for a corresponding user from the required transmission power controller 302 in step 402, and controls the transmission power controller 305 to adjust transmission power of a packet data control channel of the corresponding user to the required transmission power value in step 403. After performing the power control operation for one slot, the controller 303 waits for power control for the next slot in step 404.

If it is determined in step 401 that the number of the simultaneously serviced users is 2, the controller 303 receives required transmission power values of packet data control channels for a first user and a second user from the required transmission power controller 302 in step 405, and controls transmission power of the packet data control channels for the respective users in steps 406 and 408. In step 406, the controller 303 controls transmission power of a first packet data control channel assigned to the first user. In step 408, the controller 303 controls transmission power of a second packet data control channel assigned to the second user. In order to determine transmission power of the first packet data control channel, the controller 303 compares the required transmission power value of the packet data control channel for the first user with the required transmission power value of the packet data control channel for the second user in step 406. A larger value out of the two required transmission power values is determined as a transmission power value for controlling the first packet data control channel. The reason for determining the larger value out of the two values as transmission power of the first packet data control channel is because the first packet data control channel must be successfully transmitted not only to the first user but also to the second user. Therefore, in step 406, the controller 303 guarantees reception performance of a first packet data channel to both users by controlling transmission power of the first packet data control channel on the basis of a user having a worse channel reception environment out of the first and second users. In step 408, the controller 303 determines to adjust transmission power of the second packet data control channel to the required transmission power value of the packet data control channel for the second user. Therefore, in step 408, the controller 303 adjusts transmission power of the second packet data control channel to the required transmission power value of the packet data control channel for the second user. The power control operations in the steps 406 and 408 are simultaneously performed. After the power control operations, the controller 303 waits for power control for the next slot in steps 407 and 409.

The operation of calculating required transmission power values for the packet data control channels of the individual users by the required transmission power calculator 302 illustrated in FIG. 3, and the operation of performing power control on the packet data control channels in steps 406 and 408 according to the required transmission power values calculated by the controller 303 will be described in detail herein below. Herein, the operation of calculating required transmission power values for the individual users and the operation of performing power control based on the calculation results are simply given to facilitate a better understanding of the present invention by way of example.

As described above, every mobile station measures a signal level of a pilot channel received from a base station for each slot, and transmits the measured value to the base station over R-CQICH. The measured value transmitted to the base station is received by the channel environment information receiver 301 illustrated in FIG. 3. The measured value can be represented with 4 bits, and this value becomes a measured value for a $$\frac{E_p}{N_t}$$

value received by a mobile station. If a value obtained by expressing with 4 bits a $$\frac{E_p}{N_t}$$

value received by a first mobile station is defined as $$\frac{\overline{E}_p}{N_{t_1}}$$

and a value obtained by expressing with 4 bits a $$\frac{E_p}{N_t}$$

value received by a second mobile station is defined as $$\frac{\overline{E}_p}{N_{t_2}},$$

then the first mobile station and the second mobile station transmit $$\frac{\overline{E}_p}{N_{t_1}} \text{ and } \frac{\overline{E}_p}{N_{t_2}}$$

to the base station over R-CQICH, respectively. The required transmission power calculator 302 of the base station calculates a gain (or required power) of a packet data control channel to be transmitted to each mobile station using the $$\frac{\overline{E}_p}{N_{t_1}} \text{ and } \frac{\overline{E}_p}{N_{t_2}}$$

received by the channel environment information receiver 301, in accordance with Equations (1) and (2).

$$E_{C,PDCCH,user1} = E_p \times \frac{E_C}{N_{t_{target}}} \div \frac{\overline{E}_p}{N_{t_1}} \quad (1)$$

$$E_{C,PDCCH,user2} = E_p \times \frac{E_C}{N_{t_{target}}} \div \frac{\overline{E}_p}{N_{t_2}} \quad (2)$$

In Equations (1) and (2), $E_{C,PDCCH,user1}$ represents transmission power energy required for transmitting the packet data control channel to the first mobile station, and $E_{C,PDCCH,user2}$ represents transmission power energy required for transmitting the packet data control channel to the second mobile station. $E_p$ represents energy of a pilot channel currently transmitted by the corresponding base station.

$$\frac{E_C}{N_{t_{target}}}$$

represents a received signal-to-noise ratio (SNR) required for a packet data control channel, and a $$\frac{E_C}{N_{t_{target}}}$$

value is previously determined value.

As stated above, $$\frac{\overline{E_p}}{N_{t_1}} \text{ and } \frac{\overline{E_p}}{N_{t_2}},$$

signal levels of forward pilot channels received from the first mobile station and the second mobile station over the R-CQICH, are values representing forward channel reception environments of the individual mobile stations. The operation of calculating transmission power required for transmitting control information to be transmitted to the mobile stations over the packet data control channels in accordance with Equations (1) and (2) is performed by the required transmission power calculator 302 of FIG. 3, as described above. That is, the required transmission power controller 302 receives measured levels of forward pilot signals of the individual mobile stations through the channel environment information receiver 301, and calculates power values required for transmitting control information by substituting the measured levels into Equation (1) or (2). The controller 303 controls power of the control information to be transmitted to the mobile stations, using the power values calculated by the required transmission power calculator 302. The operations of controlling transmission power of the first packet data control channel to be transmitted to the first mobile station and the second packet data control channel to be transmitted to the second mobile station are performed as described in conjunction with the steps 406 and 408, respectively.

For example, assuming that required power values $E_{C,PDCCH,user1}$ and $E_{C,PDCCH,user2}$ calculated for the first mobile station and the second mobile station for a first slot (or first time period) are 8mW and 10mW, respectively, and required power values $E_{C,PDCCH,user1}$ and $E_{C,PDCC,user2}$ calculated for the first mobile station and the second mobile station for a second slot (or second time period following the first time period) are 12mW and 10mW, respectively. That the required power of the second mobile station is higher than the required power of the first mobile station for the first slot means that a channel reception environment of the second mobile station is relatively poor. Therefore, in order for the second mobile station to receive the first packet data control channel, transmission power of the first packet data control channel must be adjusted to a transmission power value required by the second mobile station. Therefore, the power control results for the first slot are as follows. The required transmission power for the first packet data control channel is set to 10mW, the larger power value out of the two required power values, and the required transmission power for the second packet data control channel is set to 10mW corresponding to the required power for the second mobile station.

That the required power of the first mobile station is higher than the required power of the second mobile station for the second slot means that a channel reception environment of the first mobile station is relatively poor. Therefore, even though transmission power of the first packet data control channel is adjusted to the required power of the first mobile station, the second mobile station having a relatively excellent channel environment can successfully receive the first packet data control channel. As a result, the power control results for the second slot are as follows. That is, transmission power for the first packet data control channel is set to 12mW, and transmission power for the second packet data control channel is set to 10mW.

Figure 5:
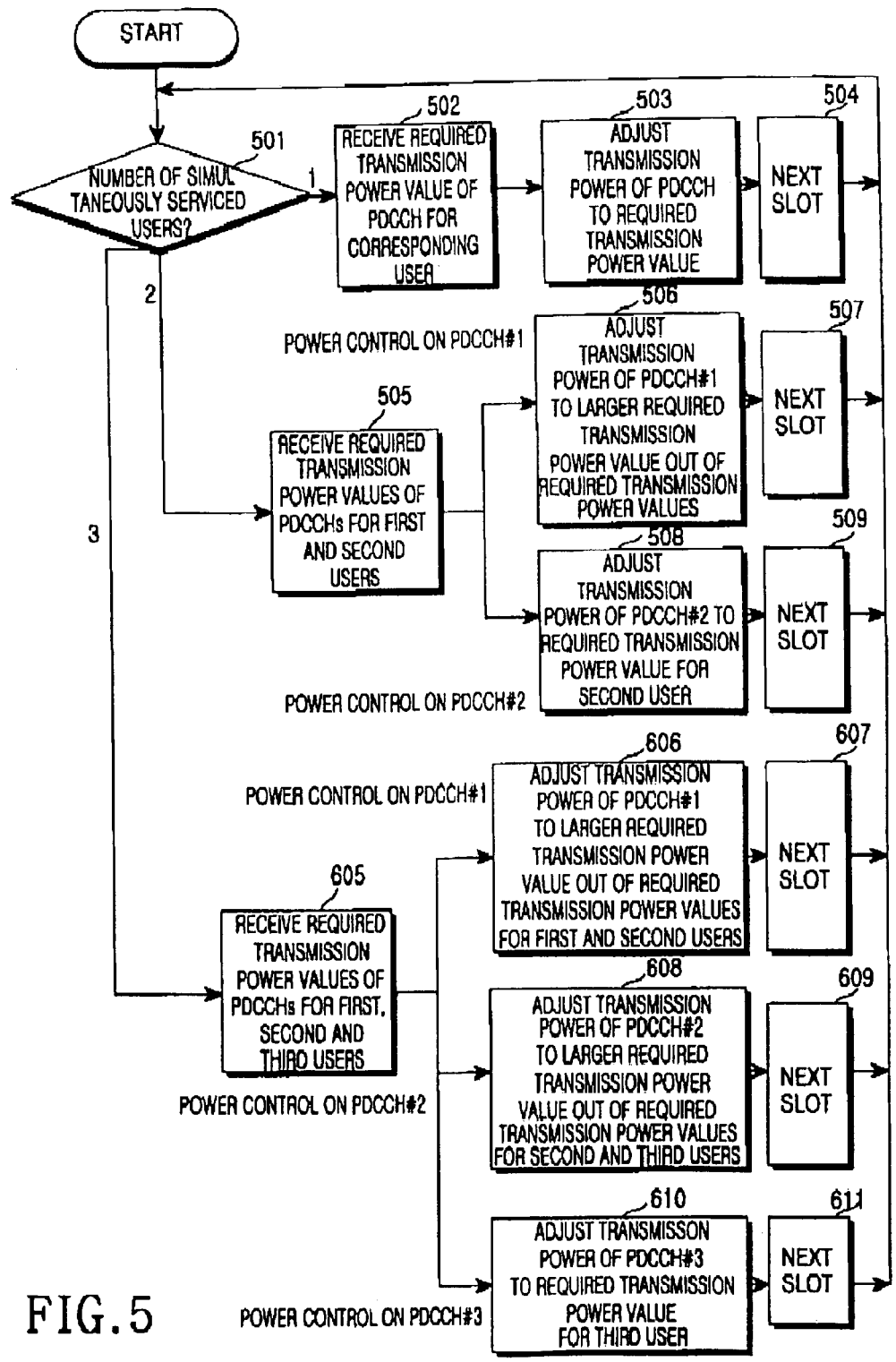
FIG. 5 is a flowchart illustrating a procedure for controlling transmission power of a packet data control channel according to another embodiment of the present invention.

FIG. 5 is a flowchart illustrating a procedure for controlling transmission power of a packet data control channel according to another embodiment of the present invention. Specifically, FIG. 5 illustrates an example of the power control operation performed for each slot for a packet data control channel of each mobile station in a system which can simultaneously service as many as 3 users (or mobile stations) by CDM.

Referring to FIG. 5, the controller 303 illustrated in FIG. 3 determines the number of users (or mobile stations) that will be simultaneously serviced for a predetermined time period (or slot) in step 501. The number of the service users can be calculated by a scheduler (not shown). If it is determined in step 501 that the number of the simultaneously serviced users is 1, the controller 303 receives a required transmission power value of a packet data control channel for a corresponding user from the required transmission power controller 302 in step 502, and controls the transmission power controller 305 to adjust transmission power of a packet data control channel of the corresponding user to the required transmission power value in step 503. After performing the power control operation for one slot, the controller 303 waits for power control for the next slot in step 504.

However, if it is determined in step 501 that the number of the simultaneously serviced users is 2, the controller 303 receives required transmission power values of packet data control channels for a first user and a second user from the required transmission power controller 302 in step 505, and controls transmission power of the packet data control channels for the respective users in steps 506 and 508. In step 506, the controller 303 controls transmission power of a first packet data control channel. In step 508, the controller 303 controls transmission power of a second packet data control channel.

In order to determine transmission power of the first packet data control channel, the controller 303 compares the required transmission power value of the packet data control channel for the first user with the required transmission power value of the packet data control channel for the second user in step 506. A larger value out of the two required transmission power values is determined as a transmission power value for controlling the first packet data control channel. The reason for determining the larger value out of the two values as transmission power of the first packet data control channel is because the first packet data control channel must be successfully transmitted not only to the first user but also to the second user. Therefore, in step 506, the controller 303 guarantees reception performance of a first packet data channel to both users by controlling transmission power of the first packet data control channel on the basis of a user having a poor channel reception environment out of the first and second users.

In step 508, the controller 303 adjusts transmission power of the second packet data control channel to the required transmission power value of the packet data control channel for the second user. Therefore, in step 508, the controller 303 adjusts transmission power of the second packet data control channel to the required transmission power value of the packet data control channel for the second user. The power control operations in the steps 506 and 508 are simultaneously performed, and after the power control operations, the controller 303 waits for power control for the next slot in steps 507 and 509.

If it is determined in step 501 that the number of the simultaneously serviced users is 3, the controller 303 receives required transmission power values of packet data control channels for a first user, a second user, and a third user from the required transmission power controller 302 in step 605, and controls transmission power of the packet data control channels for the respective users in steps 606, 608, and 610. In step 606, the controller 303 controls transmission power of a first packet data control channel. In step 608, the controller 303 controls transmission power of a second packet data control channel. In step 610, the controller 303 controls transmission power of a third packet data control channel.

In order to determine transmission power of the first packet data control channel, the controller 303 compares the required transmission power value of the packet data control channel for the first user with the required transmission power value of the packet data control channel for the second user in step 606. A larger value out of the two required transmission power values is determined as a transmission power value for controlling the first packet data control channel. The reason for determining the larger value out of the two values as transmission power of the first packet data control channel is because the first packet data control channel must be successfully transmitted not only to the first user but also to the second user. Therefore, in step 606, the controller 303 guarantees reception performance of a first packet data channel to both users by controlling transmission power of the first packet data control channel on the basis of a user having a poor channel reception environment out of the first and second users.

In order to determine transmission power of the second packet data control channel, the controller 303 compares the required transmission power value of the packet data control channel for the second user with the required transmission power value of the packet data control channel for the third user in step 608. A larger value out of the two required transmission power values is determined as a transmission power value for controlling the second packet data control channel. The reason for determining the larger value out of the two values as transmission power of the second packet data control channel is because the second packet data control channel must be successfully transmitted not only to the second user but also to the third user. Therefore, in step 608, the controller 303 guarantees reception performance of a second packet data channel to both users by controlling transmission power of the second packet data control channel on the basis of a user having a poor channel reception environment out of the second and third users.

In step 610, the controller 303 adjusts the transmission power of the third packet data control channel to the required transmission power value of the packet data control channel for the third user. Therefore, in step 610, the controller 303 adjusts transmission power of the third packet data control channel to the required transmission power value of the packet data control channel for the third user. The power control operations in the steps 606, 608 and 610 are simultaneously performed, and after the power control operations, the controller 303 waits for power control for the next slot in steps 607, 609 and 611.

As described above, the power control method proposed by the present invention performs efficient power control on the respective when a specific user must receive not only a channel transmitting its own control information, but also channels transmitting control information for other users in a mobile communication system transmitting packet data.

While the invention has been shown and described with reference to a certain preferred embodiment thereof, it will be understood by those skilled in the art that various changes in form and details may be made therein without departing from the spirit and scope of the invention as defined by the appended claims. For example, although the number of the simultaneously serviced users is 2 or 3 in the foregoing description, the present invention can be equally applied even to the case where the number of the simultaneously serviced user is 4 or more.

What is claimed is:

1. A method for controlling power of individual control information transmitted to mobile stations by a base station in a communication system including the base station and at least two mobile stations connected to the base station, wherein a first mobile station receives first control information transmitted from the base station, and a second mobile station receives second control information transmitted from the base station, the method comprising the steps of:

determining forward channel conditions of a first mobile station and a second mobile station for a previous time period preceding a preset time period;

calculating power levels required for transmitting control information to the mobile stations for the preset time period; and transmitting the first control information for the first mobile station at a power level greater than a power level of the second control information for the second mobile station, and transmitting the second control information for the second mobile station at a required power level, wherein the second mobile station also receives the first control information for the first mobile station transmitted from the base station.

2. The method of claim 1, wherein each transmission power is calculated using the forward channel condition of each mobile station and transmission power used for transmitting control information to each mobile station for the previous time period.

3. The method of claim 1, wherein the control information is a last Walsh code index indicating a Walsh code to be used during a service among a plurality of Walsh codes provided by the base station.

4. A method for controlling power of individual control information transmitted to mobile stations by a base station in a communication system including the base station and at least two mobile stations connected to the base station, the mobile stations receiving a data service from the base station for a preset time period, wherein the base station transmits to the mobile stations control information to be uniquely used by the mobile stations during the data service, a first mobile station receives its own control information transmitted from the base station, and a second mobile station receives its own control information and the control information for the first mobile station transmitted from the base station, the method comprising the steps of:

determining forward channel conditions of the mobile stations for a previous time period preceding the preset time period;

calculating power levels required for transmitting control information to the mobile stations for the preset time period, using the forward channel conditions of the mobile stations and transmission power used for transmitting control information to each of the mobile stations for the previous time period; and transmitting a first control information for the first mobile station at a relatively higher power level out of the calculated required power levels, and transmitting a second control information for the second mobile station at a required power level, wherein the second mobile station also receives the first control information for the first mobile station transmitted from the base station.

5. The method of claim 4, wherein the control information is a last Walsh code index indication a Walsh code to be used during a service among a plurality of Walsh codes provided by a base station.

6. The method of claim 4, wherein the power level required for transmitting control information to the first mobile station is calculated by $$E_{C,PDCCH,user1} = E_p \times \frac{E_C}{N_{t_{target}}} \div \frac{\overline{E_p}}{N_{t_1}}$$

where $E_{C,PDCCH,user1}$ represents a power level required for transmitting control information to the first mobile station, $E_p$ represents energy of a pilot channel transmitted by the base station for the previous time period, $$\frac{E_C}{N_{t_{target}}}$$

represents a received signal-to-noise ratio (SNR) required for transmitting control information, and $$\frac{\overline{E_p}}{N_{t_1}}$$

represents a measure level of a pilot signal from the first mobile station.

7. The method of claim 4, wherein the power level required for transmitting control information to the second mobile station is calculated by $$E_{C,PDCCH,user2} = E_p \times \frac{E_C}{N_{t_{target}}} \div \frac{\overline{E_p}}{N_{t_2}}$$

where $E_{C,PDCCH,user2}$ represents a power level required for transmitting control information to the second mobile station, $E_p$ represents energy of a pilot channel transmitted by the base station for the previous time period, $$\frac{E_C}{N_{t_{target}}}$$

represents a received signal-to-noise ratio (SNR) required for transmitting control information, and $$\frac{\overline{E_p}}{N_{t_2}}$$

represents a measure level of a pilot signal from the second mobile station.

8. A base station apparatus for controlling power of individual control information transmitted to mobile stations by a base station in a communication system including the base station and at least two mobile stations connected to the base station, wherein a first mobile station receives first control information transmitted from the base station, and a second mobile station receives second control information transmitted from the base station, the apparatus comprising:

a receiver for receiving information on forward channel conditions of the first mobile station and the second mobile station for a previous time period preceding the preset time period;

a channel transmitter for transmitting individual control information to the first mobile station and the second mobile station for the preset time period; and a transmission power controller for, if a channel condition of the first mobile station is worse than a channel condition of the second mobile station, transmitting control information for the first mobile station at a first transmission power, and transmitting control information for the second mobile station at a second transmission power lower than the first transmission power,, wherein the second mobile station also receives the first control information for the first mobile station transmitted from the base station.

9. The base station apparatus of claim 8, further comprising a calculator for calculating the first transmission power and the second transmission power.

10. The base station apparatus of claim 9, wherein the calculator calculates each transmission power using the forward channel condition of each mobile station and transmission power used for transmitting control information to each mobile station for the previous time period.

11. The base station apparatus of claim 9, wherein the control information is a last Walsh code index indicating a Walsh code to be used during a service among a plurality of Walsh codes provided by the base station.

12. A base station apparatus for controlling power of individual control information transmitted to mobile stations by a base station in a communication system including the base station and at least two mobile stations connected to the base station, the mobile stations receiving a data service from the base station for a preset time period, wherein the base station transmits to the mobile stations control information to be uniquely used by the mobile stations during the data service, a first mobile station receives its own control information transmitted from the base station, and a second mobile station receives its own control information and the control information for the first mobile station transmitted from the base station, the apparatus comprising:

a receiver for receiving information on forward channel conditions of the mobile stations for a previous time period preceding the preset time period;

a channel transmitter for transmitting individual control information to the first mobile station and the second mobile station for the preset time period;

a required transmission power calculator for calculating power levels required for transmitting the control information to each of the mobile stations for the preset time period using the forward channel condition of each of the mobile stations and transmission power used for transmitting control information to each of the mobile stations for the previous time period; and a transmission power controller for transmitting control information for the first mobile station at a relatively higher power level out of the calculated required power levels and transmitting control information for the second mobile station at a required power levels, wherein the second mobile station also receives the first control information for the first mobile station transmitted from the base station.

13. The base station apparatus of claim 12, wherein the required transmission power calculator calculates the power level required for transmitting control information to the first mobile station in accordance with the following equation, $$E_{C,PDCCH,user1} = E_p \times \frac{E_C}{N_{t_{target}}} \div \frac{\overline{E_p}}{\overline{N_{t_1}}}$$

where $E_{C,PDCCH,user1}$ represents a power level required for transmitting control information to the first mobile station, $E_p$ represents energy of a pilot channel transmitted by the base station for the previous time period, $$\frac{E_C}{N_{t_{target}}}$$

represents a received signal-to-noise ratio (SNR) required for transmitting control information, $$\frac{\overline{E_p}}{\overline{N_{t_1}}}$$

and represents a measure level of a pilot signal from the first mobile station.

14. The base station apparatus of claim 12, wherein the required transmission power calculator calculates the power level required for transmitting control information to the second mobile station in accordance with the following equation, $$E_{C,PDCCH,\ user\ 2} = E_p \times \frac{E_C}{N_{t_{target}}} \div \frac{\overline{E_p}}{\overline{N_{t_2}}}$$

where $E_{C,PDCCH,user2}$ represents a power level required for transmitting control information to the second mobile station, $E_p$ represents energy of a pilot channel transmitted by the base station for the previous time period, $$\frac{E_C}{N_{t_{target}}}$$

represents a received signal-to-noise ratio (SNR) required for transmitting control information, and $$\frac{\overline{E_p}}{\overline{N_{t_2}}}$$

represents a measure level of a pilot signal from the second mobile station.

15. The base station apparatus of claim 12, wherein the control information is a last Walsh code index indicating a Walsh code to be used during a service among a plurality of Walsh codes provided by the base station.

16. A power control apparatus in a communication system including a base station and at least two mobile stations connected to the base station, the mobile stations receiving a data service from the base station for a preset time period, wherein the base station transmits to the mobile stations control information to be uniquely used by the mobile stations during the data service, a first mobile station receives its own control information transmitted from the base station, and a second mobile station receives its own control information and the control information for the first mobile station transmitted from the base station, the apparatus comprising:

the first mobile station and the second mobile station, each including a transmitter for transmitting individual forward channel condition information of the first mobile station and the second mobile station to the base station;

the base station including, a receiver for receiving the individual forward channel condition information for a previous time period preceding the preset time period;

a channel transmitter for transmitting individual control information to the first mobile station and the second mobile station for the preset time period; and a transmission power controller for, if a channel condition of the first mobile station is worse than a channel condition of the second mobile station, transmitting control information for the first mobile station at a first transmission power, and transmitting control information for the second mobile station at a second transmission power lower than the first transmission power, and if the channel condition of the first mobile station is better than the channel condition of the second mobile station, transmitting control information for both of the first mobile station and the second mobile station at the second transmission power.

17. The power control apparatus of claim 16, wherein the base station further comprises a calculator for calculating the first transmission power and the second transmission power.

18. The power control apparatus of claim 17, wherein the calculator calculates each of the transmission powers using the forward channel condition of each of the mobile stations and transmission power used for transmitting control information to each of the mobile stations for the previous time period.

* * * * *